United States Patent
Frye, Jr. et al.

(10) Patent No.: US 7,058,773 B1
(45) Date of Patent: Jun. 6, 2006

(54) SYSTEM AND METHOD FOR MANAGING DATA IN A DISTRIBUTED SYSTEM

(75) Inventors: Dwight R. Frye, Jr., Cary, NC (US); Robert A. Mackie, Cary, NC (US); Keith R. Schomburg, Apex, NC (US); John G. White, Cary, NC (US); Thomas R. Bakita, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 433 days.

(21) Appl. No.: 10/346,352

(22) Filed: Jan. 16, 2003

(51) Int. Cl.
*G06F 12/16* (2006.01)

(52) U.S. Cl. .................................. 711/162

(58) Field of Classification Search .............. 711/156, 711/162, 161; 707/204, 103 R, 203; 714/6
See application file for complete search history.

(56) References Cited

U.S. PATENT DOCUMENTS

| | | | | |
|---|---|---|---|---|
| 5,706,506 A * | 1/1998 | Jensen et al. | ........... | 707/103 R |
| 5,787,470 A * | 7/1998 | DeSimone et al. | ......... | 711/124 |
| 5,802,563 A | 9/1998 | Hagersten et al. | ......... | 711/122 |
| 5,893,150 A | 4/1999 | Hagersten et al. | ......... | 711/139 |
| 5,933,849 A | 8/1999 | Srbljic et al. | ............... | 711/118 |
| 6,026,474 A | 2/2000 | Carter et al. | ................ | 711/202 |
| 6,157,925 A | 12/2000 | Jenkins et al. | ................ | 707/10 |
| 6,487,623 B1 * | 11/2002 | Emerson et al. | ............ | 710/302 |
| 6,598,174 B1 * | 7/2003 | Parks et al. | .................... | 714/6 |
| 6,785,789 B1 * | 8/2004 | Kekre et al. | ................ | 711/162 |
| 6,816,986 B1 * | 11/2004 | Fanning | ...................... | 714/42 |

* cited by examiner

*Primary Examiner*—Hiep T. Nguyen
(74) *Attorney, Agent, or Firm*—Baker Botts L.L.P.

(57) ABSTRACT

A memory system includes a client device and multiple memory devices. The client device communicates an operation request pertaining to a particular data object to one memory device. Referencing a host table, the memory device identifies multiple memory devices associated with an object key of the data object. The memory device communicates the operation request to the identified memory devices to be completed. If one of the memory devices in the memory system becomes inaccessible, the memory system is capable of replacing the inaccessible memory device in the host table. Furthermore, if a new memory device is added to the memory system, the memory system is capable of modifying the host table to associate some of the possible object keys with the new memory device.

33 Claims, 5 Drawing Sheets

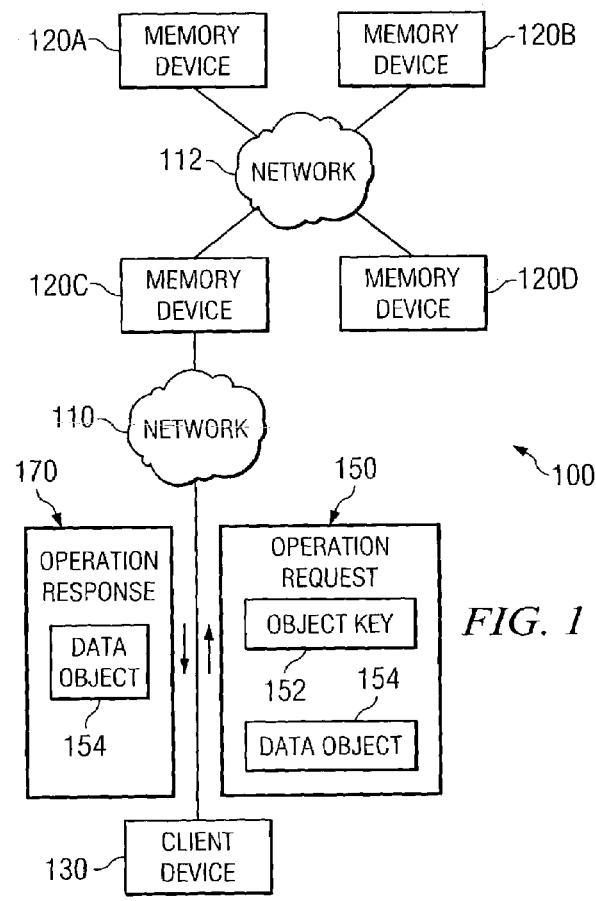
FIG. 1
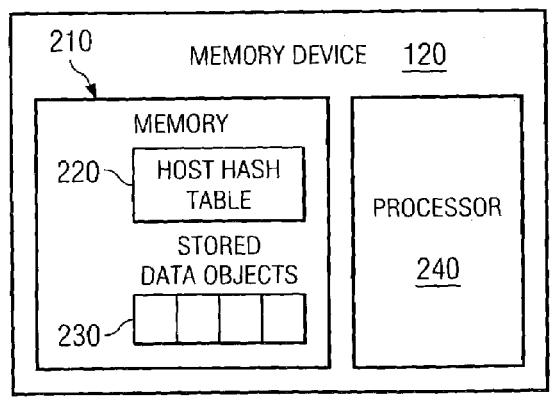
FIG. 2
| HASH VALUE | HOST PAIR |
|---|---|
| 1 | {A, B} |
| 2 | {A, C} |
| 3 | {A, D} |
| 4 | {B, A} |
| 5 | {B, C} |
| 6 | {B, D} |
| 7 | {C, A} |
| 8 | {C, B} |
| 9 | {C, D} |
| 10 | {D, A} |
| 11 | {D, B} |
| 12 | {D, C} |
| 13 | {A, B} |
| 14 | {B, C} |
| 15 | {C, D} |
FIG. 3

| HASH VALUE 222 | HOST PAIR 224A |
|---|---|
| | 226A 228A |
| 1 | {A, B} |
| 2 | {A, C} |
| 3 | {A, D} |
| 4 | {B, A} |
| 5 | {B, C} |
| 6 | {B, D} |
| 7 | {C, A} |
| 8 | {C, B} |
| 9 | {C, D} |
| 10 | {D, A} |
| 11 | {D, B} |
| 12 | {D, C} |
| 13 | {A, B} |
| 14 | {B, C} |
| 15 | {C, D} |

220A ↗

502 markers at rows 1, 4, 5, 6, 8, 11, 13, 14

| HASH VALUE 222 | HOST PAIR 224B |
|---|---|
| | 226B 228B |
| 1 | {A, C} |
| 2 | {A, C} |
| 3 | {A, D} |
| 4 | {A, D} |
| 5 | {C, A} |
| 6 | {D, A} |
| 7 | {C, A} |
| 8 | {C, D} |
| 9 | {C, D} |
| 10 | {D, A} |
| 11 | {D, C} |
| 12 | {D, C} |
| 13 | {A, C} |
| 14 | {C, A} |
| 15 | {C, D} |

220B ↗

| HASH VALUE | HOST PAIR |
|---|---|
| | 226A 228A |
| 1 | {A, B} |
| 2 | {A, C} |
| 3 | {A, D} |
| 4 | {B, A} |
| 5 | {B, C} |
| 6 | {B, D} |
| 7 | {C, A} |
| 8 | {C, B} |
| 9 | {C, D} |
| 10 | {D, A} |
| 11 | {D, B} |
| 12 | {D, C} |
| 13 | {A, B} |
| 14 | {B, C} |
| 15 | {C, D} |

| HASH VALUE | HOST PAIR |
|---|---|
| 1 | {A, B} |
| 2 | {A, C} |
| 3 | {A, D} |
| 4 | {B, A} |
| 5 | {B, C} |
| 6 | {B, D} |
| 7 | {C, A} |
| 8 | {C, B} |
| 9 | {C, D} |
| 10 | {D, A} |
| 11 | {D, B} |
| 12 | {D, C} |
| | 226C 228C |
| 13 | {E, A} |
| 14 | {E, B} |
| 15 | {E, C} |

| HASH VALUE | HOST PAIR |
|---|---|
| 1 | {A, B} |
| 2 | {A, C} |
| 3 | {A, D} |
| 4 | {B, A} |
| 5 | {B, C} |
| 6 | {B, D} |
| 7 | {C, A} |
| 8 | {C, B} |
| 9 | {C, D} |
| 10 | {D, A} |
| 11 | {D, B} |
| 12 | {D, C} |
| 13 | {E, A}, {A, B} |
| 14 | {E, B}, {B, C} |
| 15 | {E, C}, {C, D} |

SYSTEM AND METHOD FOR MANAGING DATA IN A DISTRIBUTED SYSTEM

TECHNICAL FIELD OF THE INVENTION

This invention relates in general to a data storage system, and more particularly to a system and method for managing data in a distributed system.

BACKGROUND OF THE INVENTION

Distributed caching is a common characteristic of modern data networks, particularly where the network includes web servers. In a distributed cache system, data is stored on a variety of caching devices located at various points on a network. Once the data is stored, the network can later retrieve the data as requested. Distributed caching allows for more optimal use of available storage space and provides a dynamic system capable of compensating for failure of individual system components. Nonetheless, for distributed caching to be effective, the system must quickly identify the location of data stored therein.

A number of techniques have been developed for managing data in a distributed cache system to provide fast access to stored data. Still, most of these techniques are effective only when the caching devices are reliable. When cache failure occurs, data is lost. Certain techniques address this problem by replicating data from its source after a cache failure has occurred. However, in many applications stored data is transient and the original data is not available for replication.

Additionally, as new cache devices become available on a network, system speed may be increased by moving some data to the new cache device. Thus, an optimal method must be able to adapt to the addition of cache devices to the system as well.

SUMMARY OF THE INVENTION

From the foregoing, it may be appreciated by those skilled in the art that a method is desired for managing data stored in a distributed cache system that allows for reliable storage of transient data. More specifically, a method is desired for efficiently managing transient data that provides for reliable data access in the face of cache failure and one that also makes effective use of newly accessible cache devices. In accordance with the present invention, the disadvantages and problems associated with distributed memory systems have been substantially reduced or eliminated. In particular, the present invention provides a method and system for managing data in a distributed system.

In accordance with one embodiment of the present invention, a method for managing data in a distributed system includes identifying a first memory device and a second memory device and associating a data object with the first and second memory devices. The data object is stored on the first and second memory devices. A change in the status of one of the plurality of memory devices is detected. A third memory device is associated with the data object in response to the change in status and the data object is stored on the third memory device.

In accordance with another embodiment of the present invention, a system for managing data in a distributed system comprises multiple memory devices, each including a first and second memory device to store a data object. The system also includes a third memory device capable of storing the data object in response to a change in status of one of the memory devices. A host table associates the first and second memory devices with the data object and is capable of associating the third memory device with the data object in response to the change in status.

Important technical advantages of certain embodiments of the present invention include providing reliable storage of transient data in a distributed memory system. Other important technical advantages of certain embodiments of the present invention include fast identification of the location of data, the ability to access data by communicating with any node of a distributed memory system, and the ability to redistribute data to utilize memory devices that become available on the memory system. Certain embodiments may include all, some, or none of these technical advantages. Other technical advantages may be readily ascertainable by those skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 1 illustrates a memory system according to one embodiment of the present invention that includes a plurality of memory devices, one or more networks and a client device;

FIG. 2 is a block diagram illustrating exemplary components of one memory device;

FIG. 3 illustrates a host table according to a particular embodiment of the present invention;

DETAILED DESCRIPTION OF THE INVENTION

Figure 4:
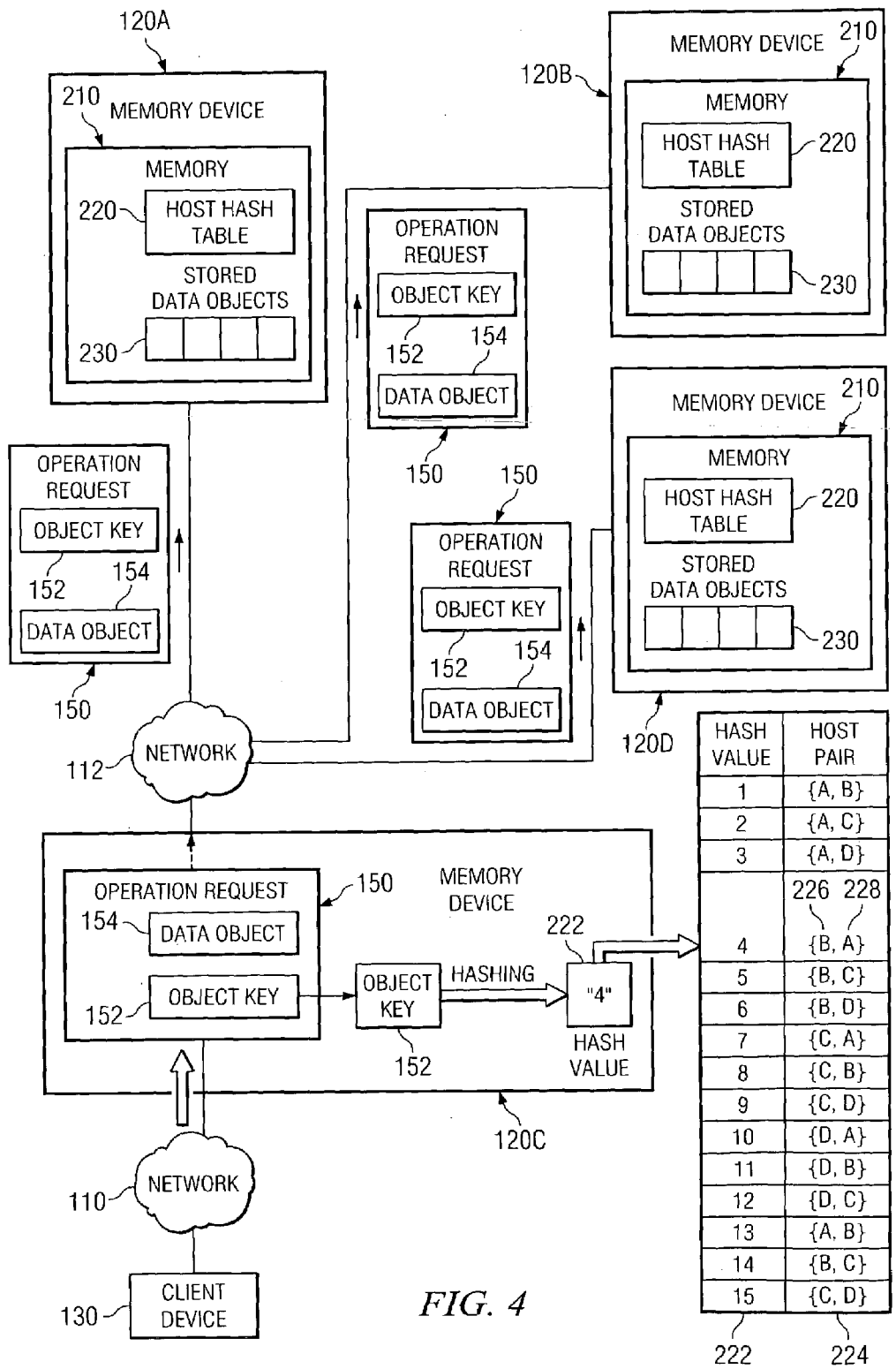
FIG. 4 illustrates operation of the memory system.

FIG. 1 illustrates a memory system 100 including a client device 130, a plurality of memory devices 120, and networks 110 and 112. Individual memory devices 120 couple to other memory devices 120 using network 112. Client device 130 couples to a particular memory device 120C through network 110.

Memory devices 120 store information received from client device 130 and make stored information available to client device 130. Memory devices 120 can be servers, network-accessible PCs, networked storage devices, or any other devices capable of both receiving and storing information from client device 130.

Client device 130 is operable to write information to and read information from memory devices 120. Client device 130 can be a general purpose computer, dedicated microprocessor, or other device capable of communicating electronic information with memory devices 120. Although the particular embodiment of memory system 100 shown in FIG. 1 includes one client device 130 coupled to a particular memory device 120, memory system 100 may include any number of client devices 130 each coupled to one or more memory devices 120.

Networks 110 and 112 represent any hardware and/or software configured to communicate information in the form of packets, cells, frames, segments, or other portions of data. Networks 110 and 112 may include routers, hubs, switches, gateways, or any other suitable components in any suitable form or arrangement. Although networks 110 and 112 may be physically and logically distinct, network 110 may refer to the same hardware and/or software as network 112. Networks 110 and 112 may include any combination of public or private communications equipment such as elements of a public switched telephone network (PSTN), a global computer network such as the Internet, a local area network (LAN), a wide area network (WAN), or other appropriate communications equipment.

In operation, client device 130 communicates an operation request 150 to any memory device 120 regarding a data object 154 to be written to or read from memory devices 120. For the sake of simplicity, operation request 150 is assumed herein to relate to a read or write operation. However, operation request 150 may relate to any suitable operation that may be executed on the data stored on memory system 100.

Operation request 150 includes an object key 152 having information uniquely associated with data object 154. If operation request 150 is a write request, operation request 150 may additionally include the particular data object 154 to be written to memory devices 120. Data object 154 may represent a complete data record, one or more fields of a data record, a data string, or any other collection of information.

An exemplary embodiment of memory system 100 serves as a distributed cache system for a network of web servers. In such an embodiment, data object 154 may represent a record associated with a user accessing the Internet through a gateway coupled to memory system 100. The record may contain personal information about the user, including consumer preferences, favorite websites, and demographic data about the user. The record may contain information relating to the user's relationship with the owner of the gateway, including the user's account number and the user's billing plan for internet services. Accordingly, object key 156 may represent information identifying the user, such as an account number, social security number, or any other information uniquely identifying the user. In such an embodiment, data object 154 represents transient data that client device 130 does not itself store and which would no longer be available if memory devices 120 lose data object 154.

Once memory device 120C receives operation request 150, memory device 120C extracts object key 152 from operation request 150. Using object key 152, memory device 120C identifies a plurality of memory devices 120 to receive operation request 150 and communicates operation request 150 to any or all of the identified memory devices 120. The identified memory devices 120 receive the operation request 150 and perform the requested memory operation.

If the operation request 150 relates to a read operation, memory device 120 may communicate to the original memory host 120C an operation response 170 including data object 154. The memory device 120C that originally received the operation request 150 from client device 130 then communicates operation response 170 to client device 130 through network 110.

As noted above, memory system 100 may include multiple client devices 130 coupled to any or all memory devices 120. An advantage of such an embodiment is that a particular client device 130 may access any data object 154 stored on memory system 100 by contacting any memory device 130. Thus, for a given client device 130, any memory device 120 can serve as a point of access to memory system 100 and the data objects 154 stored on memory system 100.

FIG. 2 illustrates exemplary components of a memory device 120 according to a particular embodiment. Memory device 120 includes memory 210 and processor 240.

Processor 240 may be a general purpose computer, dedicated microprocessor, or other processing device capable of communicating electronic information. Examples of processor 240 include application-specific integrated circuits (ASICs), field-programmable gate arrays (FPGAs), digital signal processors (DSPs) and any other suitable specific or general purpose processors.

Memory 210 holds a host table 220 and stored data objects 230. Memory 210 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices. Additionally, memory 210 has the capability to be updated dynamically as desired.

FIG. 3 illustrates an exemplary host table 220 for memory system 100 in a particular embodiment. Host table 220 includes hash values 222 and host pairs 224. Each hash value 222 is associated with a host pair 224. Host pair 224 includes a first peer memory device identifier 226 and a second peer memory device identifier 228. First peer memory device identifier 226 and second peer memory device identifier 228 represent particular memory devices 120. Although FIG. 3 illustrates a host table 220 that associates two memory devices 120 with each hash value 222, host table 220 may associate one or more memory devices 120 with each hash value depending on the needs of memory system 100.

FIG. 4 illustrates steady-state operation of a particular embodiment of memory system 100. In FIG. 4, memory device 120C receives operation request 150 and extracts object key 152. Memory device 120C generates hash value 222 by applying a hashing function to object key 152. The hashing function can be any process by which the input value is transformed into a shorter, fixed-length output value that uniquely represents the input value. Memory device 120C then retrieves a host pair 224 associated with hash value 222 in host table 220. Host pair 224 includes first peer memory device identifier 226 and second peer memory device identifier 228.

Depending on the type of operation request in question and the characteristics of memory system 100, memory device 120C communicates the operation request 150 to either or both of the memory devices 120 represented by first peer memory device identifier 226 and second peer memory device identifier 228 to complete the operation. For example, memory system 100 may be designed to maximize system speed. Thus, memory device 120C may send the request to both the memory devices 120 represented by first peer memory device identifier 226 and second peer memory device identifier 228 and pass the first operation response 170 received to client device 130. Instead, memory system 100 may be designed to limit the amount of traffic on network 112 and so memory device 120C may send the operation request 150 to only one of the two memory devices 120.

In the example shown in FIG. 4A, object key 152 hashes to a hash value 222 of "14". Host table 220 associates a hash value 222 of "4" with the host pair 224 of "{B, A}". This means that host pair 224 identifies memory device 120B from first peer memory device identifier 226 and memory device 120A from second peer memory device identifier 228 for this hash value 222. Thus, memory device 120C communicates operation request 150 to either or both of memory devices 120B and 120A.

If operation request 150 relates to a write operation, data object 154 is communicated to memory device 120B and memory device 120A in accordance with first peer memory device identifier 226 and second peer memory device identifier 228, respectively. In response, memory device 120B and memory device 120A store data object 154 in their respective memories 210.

If operation request 150 relates to a read operation, memory server 120C communicates operation request 150 to either or both of memory device 120B and memory device 120A pursuant to first peer memory device identifier 226 and second peer memory device identifier 228. In response, memory device 120B or memory device 120A communicates data object 154 to memory device 120C. Memory device 120C then communicates data object 154 to client device 130.

Figures 5A, 5B, 5C:
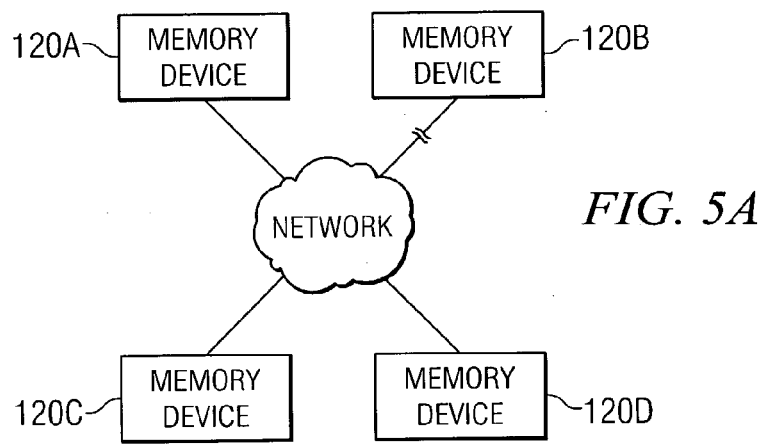
FIG. 5A illustrates the memory system of FIG. 1 after a memory device has become inaccessible.
FIG. 5B illustrates a host table for the system of FIG. 1 before the memory device has become inaccessible.
FIG. 5C illustrates one embodiment of a host table for the system of FIG. 5A after the memory device has become inaccessible.

FIGS. 5A–5C illustrate operation of one embodiment of memory system 100 after a change in status of a particular memory device 120. More specifically, FIGS. 5A–5C illustrate operation of the memory system 100 illustrated in FIG. 4A when memory device 120B becomes inaccessible. Memory devices 120 may become inaccessible for a number of reasons. Network traffic may prevent memory devices 120 from maintaining reliable connections. Component failure may make data unavailable when needed. Data corruption of a particular memory device may prevent the data stored on that memory device from being accessible. A particular memory system 100 may be operable to detect any of these situations.

In FIG. 5A, memory device 120B becomes inaccessible. Stored data objects 230 located on inaccessible memory device 120B are now only stored on one memory device 120 in memory system 100. To prevent the loss of stored data objects 230 due to the subsequent failure of other memory devices 120, memory system 100 must identify replacement memory devices 120 on which to store additional copies of the stored data objects 230 previously held by inaccessible memory device 120B. Replacement memory devices 120 may be determined in a variety of ways depending on the needs and characteristics of memory system 100.

FIGS. 5B and 5C illustrate one method used in a particular embodiment of memory system 100. FIGS. 5B and 5C show an exemplary host table 220A and 220B before and after, respectively, memory system 100 has replaced inaccessible memory device 120B.

When memory system 100 detects that a memory device 120B has become inaccessible, memory system 100 determines which hash values 222, known as lost hash values 502, are associated with the inaccessible memory device 120B in host table 220. For the example host table 220 illustrated in FIG. 5B lost hash values 502 include "1", "4", "5", "6", "8", "11", "13", and "14". Then, for each lost hash value 502 and its associated host pair 224, memory system 100 determines a replacement for inaccessible memory device 120B from other memory devices 120 remaining in memory system 100.

If inaccessible memory device 120B is represented by the second peer memory device identifier 228A in the host pair 224A originally associated with any one of the lost hash values 502, then memory system 100 replaces second peer memory device identifier 228A with a new second peer memory device identifier 228B representing any remaining memory devices 120. Lost hash values 502 of "1", "8", "11", and "13" illustrate this type of replacement in FIGS. 5B and 5C. Memory system 100 then copies all stored data objects 230 whose object key 152 hashes to these lost hash value 502 from the memory device 120 represented by first peer memory device identifier 226A to a new memory device 120 represented by the new second peer memory device identifier 228B.

In the example illustrated in FIGS. 5B and 5C, memory system 100 copies data objects 154 with object keys 152 that hash to a hash value 222 of "1" to memory device 120C. Memory system 100 copies data objects 154 with object keys 152 that hash to a hash value 222 of "8" to memory device 120D. Memory system 100 copies data objects 154 with object keys 152 that hash to a hash value 222 of "11" to memory device 120C. Memory system 100 copies data objects 154 with object keys 152 that hash to a hash value 222 of "13" from memory device 120A to memory device 120C.

If inaccessible memory device 120B is represented by the first peer memory device identifier 226A in the host pair 224A associated with lost hash value 502, then memory system 100 promotes second peer memory device identifier 228A to first peer memory device identifier 226B and selects a new second peer memory device identifier 228B from remaining memory devices 120. Hash values 222 of "4", "5", "6", and "14" illustrate this type of replacement in FIGS. 5B and 5C. Memory system 100 then copies all stored data objects 230 whose object keys 152 hash to these lost hash values 502 from the memory devices represented by their first peer memory device identifier 226B (i.e., their original second peer memory device identifier 228A) to the memory device 120 associated with their new second peer memory device identifier 228B.

For example, in the example illustrated by FIGS. 5B and 5C, memory system 100 copies data objects 154 with object keys 152 that hash to a hash value 222 of "4" to memory device 120D. Memory system 100 copies data objects 154 with object keys 152 that hash to a hash value 222 of "5" to memory device 120A. Memory system 100 copies data objects 154 with object keys 152 that hash to a hash value 222 of "6" to memory device 120A. Memory system 100 copies data objects 154 with object keys 152 that hash to a hash value 222 of "14" to memory device 120A.

All of the functionality described for detecting inaccessible memory devices, determining replacement memory devices, and copying lost data objects may be distributed among any or all of the components of memory system 100. For example, in a particular embodiment of memory system 100, the processor 240 contained in each memory device 120 periodically polls the network to ensure that all memory devices 120 are accessible. When processor 240 in a particular memory device 120 detects inaccessible memory device 120B, processor 240 determines which, if any, lost hash values 502 are in the host table 220 of the particular memory device 120 containing processor 240.

In this embodiment, processor 240 then determines, as needed, new first peer memory device identifiers 226 and second peer memory device identifiers 228 for the lost hash values 502 in the corresponding host table 220 of its memory device 120 according to a predetermined process. Processor 240 updates accordingly the copy of host table 220 stored in the memory 210 of its memory device 120. Additionally, processor 240 communicates copies of stored data objects which its memory device 120 shared with inaccessible memory device 120B to the new second peer memory devices 120 identified in updated host table 220. Processor 240 also stores in memory 210 incoming copies of data objects 154 for which memory device 120 is associated with the second peer memory device identifier 228.

Alternatively, a single processor 240 could be responsible for detecting inaccessible memory devices, identifying lost hash values 502, determining replacement memory devices 120, copying affected data objects 154, and communicating updated versions of host table 220 to all memory devices 120. Furthermore, the functionality could be divided in any other suitable way among various components as fits the characteristics and requirements of the particular embodiment of memory system 100.

FIGS. 6A–6D illustrate operation of memory system 100 when a new memory device 120 is added to memory system 100. If memory system 100 detects a new memory device 120E, memory system 100 may redistribute storage of data to provide for more efficient access to stored data objects 230. Redistribution may be achieved in a variety of ways depending on the needs and characteristics of memory system 100. Moreover, redistribution among memory devices 120 may proceed until memory system 100 converges. Convergence occurs when all existing memory devices 120 in memory system 100 are referenced and references to any inaccessible memory devices 120 in memory system 100 are removed.

Figures 6A, 6B, 6C, 6D:
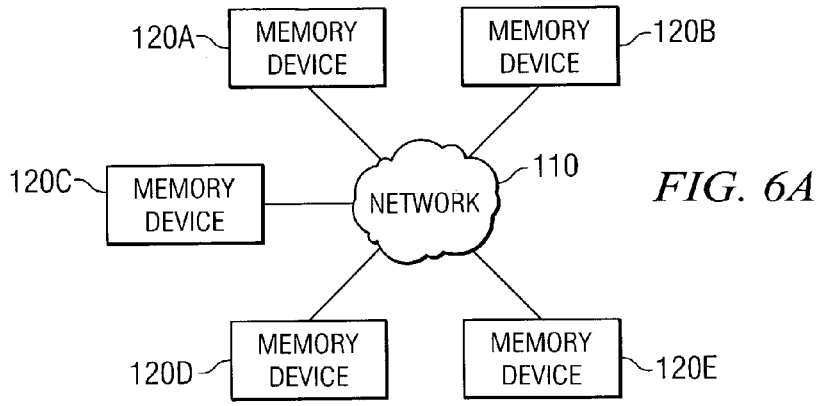
FIG. 6A illustrates the memory system of FIG. 1 after a new memory device has been added.
FIG. 6B illustrates a host table for the system of FIG. 1 before the new memory device has been added.
FIG. 6C illustrates one embodiment of a host table for the system of FIG. 6A after the new memory device has been added.
FIG. 6D illustrates another embodiment of a host table for the system of FIG. 6A after the new memory device has been added.

FIG. 6A illustrates the addition of a memory device 120E to memory system 100. In the example illustrated by FIGS. 6A–6D, new memory device 120E holds no stored data objects 230 at the outset and is not initially associated with any hash value 222 of host table 220.

FIGS. 6B and 6C show an exemplary host table 220B before and 220C after, respectively, memory system 100 has added a new memory device 120E. Memory system 100 identifies a number of hash values 222, shown as reallocated hash values 602, to be assigned to new memory device 120E. Memory system 100 then establishes a first peer memory device identifier 226 or a second peer memory device identifier 228 representing new memory device 120E for each reallocated hash value 602 and stores a copy of the updated host table 220C on each memory device 120. In the example illustrated by FIGS. 6B and 6C, reallocated hash values 602 include "13", "14", and "15" and memory system 100 has established a first peer memory device identifier 226C representing new memory device 120E for each of these reallocated hash value 602. New data objects 154 stored to memory system 100 in the future will be stored according to updated host table 220C.

Meanwhile, stored data objects 230 already on the system can be accessed by searching for the second peer memory device identifier 228 in the host pair 224 associated with the stored data object 230 in the updated host table 220C. Memory system 100 can be designed to search the memory device 120 represented by second peer memory device identifier 228 when the desired stored data object 230 is not found on the memory device 120 represented by first peer memory device identifier 226, can be designed to search the memory device 120 represented by second peer memory source identifier 226 only if the stored data object is older than a specified age 226, or can be designed to address this problem in any other manner appropriate for the particular memory system 100.

If multiple memory devices 120 are added to memory system 100, problems may arise where both first peer memory device identifier 226 and second peer memory device identifier 228 of a particular host pair 224 have been reallocated and both no longer represent memory devices 120 originally associated with the hash value 222 in question. In such a case, older stored data objects can not be accessed by reference to host table 220 unless additional precautions are taken.

Memory system 100 can handle the addition of multiple memory devices 120 in a variety of ways. Memory system 100 may limit the number of additional memory devices 120 that may be added to ensure that no host pair 224 has both first peer memory device identifier 226 and second peer memory device identifier 228 switched from the original configurations.

Alternatively, memory system 100 may copy the particular stored data objects 230 whose object key 152 hashes to a reallocated hash value 602 to new memory device 120E so that updated host table 220 will properly reflect both the first peer memory device identifier 226 and the second peer memory device identifier 228 of all stored data objects 230. In such an embodiment, memory system 100 identifies all stored data objects 230 whose object key 152 hashes to a reallocated hash value 222 and copies those stored data objects 230 to new memory device 120E. For the example illustrated by FIGS. 6A–6C, this means that all stored data objects 230 whose object key 152 hashes to a reallocated hash value 602 of "13", "14", or "15" will be copied to new memory device 120E. Memory system 100 may or may not delete those stored data objects 230 from the memory device 120 represented by their original first peer memory device identifier 226A.

FIG. 6D illustrates a third alternative solution to the problem of multiple new memory devices 620. FIG. 6D shows a host table 220D for an alternative embodiment of memory system 100. In this embodiment, memory system 100 ensures that host table 220D properly reflects the location of older stored data objects 230 by tracking changes to host table 220B with a previous host pair 224D. Thus, memory system 100 does not need to copy any stored data objects 230 already held in existing memory devices 120 to new memory device 120E.

Host table 220D represents the state of host table 220B from FIG. 6B after new memory device 120E has been added to memory system 100. When an operation request 150 requests a read of a particular stored data object 230, memory system 100 hashes the object key 152 of the stored data object 230 to get the host pair 224. If memory system 100 can not find the requested data object 154 on either of the memory devices 120 identified by host pair 224D, memory system 100 references any previous host pairs 624 associated with the reallocated hash value 602 and searches memory devices 120 identified by previous host pairs 624 for the requested data object 154.

All of the functionality described for integrating additional memory devices 120 into memory system 100 may be distributed among any or all of the components of memory system 100. For example, a single processor 240 may be responsible for detecting and integrating new memory devices 120 or all processors 240 may share the task. In general, any suitable distribution of functionality may be implemented in a particular memory system 100.

Figure 7:
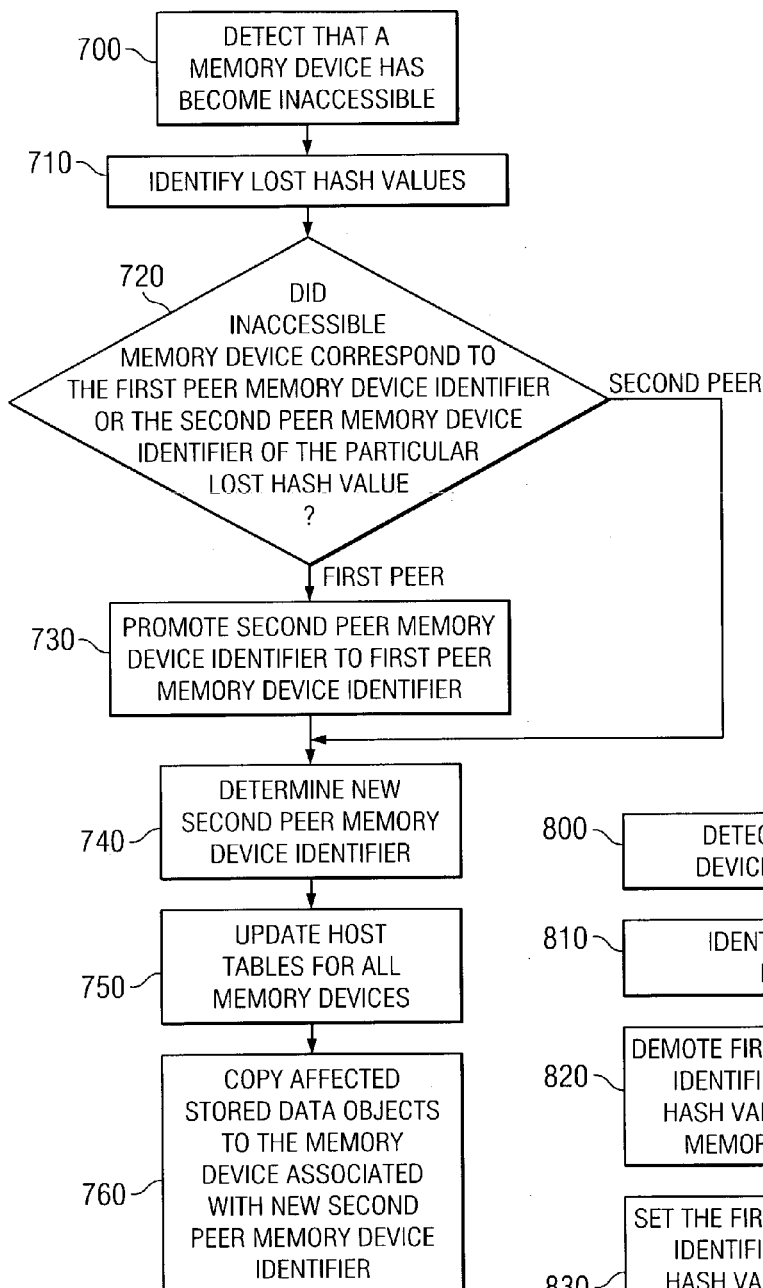
FIG. 7 illustrates a flow chart showing the steps executed by the system in responding to the loss of a memory device.

FIG. 7 is a flow chart showing the steps memory system 100 executes in responding to the loss of a memory device 120 in a particular embodiment of memory system 100. At step 700, memory system 100 detects that a particular memory device 120 has become an inaccessible, in this case memory device 120B. At step 710, memory system 100 identifies all lost hash values 502 associated with host pairs 224 in host table 220 that include inaccessible memory device 120B.

At step 720, memory system 100 determines whether inaccessible memory device 120B was identified by the first peer memory device identifier 226 or the second peer memory device identifier 228 of each particular lost hash value 502. If first peer memory device identifier 226 in the host pair 224 associated with a particular lost hash value 502 represented inaccessible memory device 120B, memory system 100 promotes the second peer memory device identifier 228 to first peer memory device identifier 226 of that host pair 224 at step 730.

Next, regardless of whether inaccessible memory device 120B corresponds to the first peer memory device identifier 226 or the second peer memory device identifier 228 of the lost hash value 502, memory system 100 determines a new second peer memory device for that host pair 224 associated with the lost hash value 502 at step 740. At step 750, memory system 100 updates the host tables 220 for all memory devices 120 to reflect the change. Memory system 100 copies affected stored data objects 230 from the memory device 120 corresponding to the new first peer memory device identifier 226 associated with the data objects 154 (i.e., the original second peer memory device identifier 228 associated with those data objects 154) to the new second peer memory device 120 corresponding to the new second peer memory device identifier 228 associated with those data objects 154 at step 760.

Figure 8:
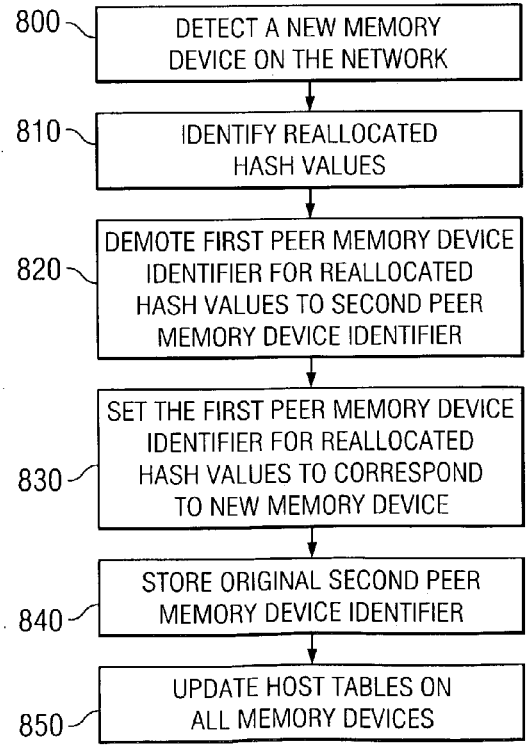
FIG. 8 illustrates a flow chart showing the steps executed by the system in responding to the addition of an additional memory device.

FIG. 8 is a flow chart showing the steps memory system 100 executes in responding to the addition of an additional memory device 120 in a particular embodiment of memory system 100. At step 800, memory system 100 detects a new memory device 120. At step 810, memory system 100 identifies one or more hash values 222 to be redistributed, reallocated hash values 602.

Memory system 100 makes the first peer memory device identifier 226 of host pairs 224 the second peer memory device identifier 228 of the new host pairs 224 associated with reallocated hash value 602 at step 820. At step 830, memory system 100 assigns a first peer memory device identifier 228 corresponding to the new memory device 120 to host pairs 224 associated with reallocated hash values 602. Memory system 100 stores the original second peer memory device identifier 228 so that previously saved data objects can still be accessed at step 840. At step 850, memory system 100 updates host tables 220 on all memory devices 120 to include new host pairs 224 for reallocated hash value 602.

Thus it is apparent that there has been provided, in accordance with the present invention, a system and method for managing data in a distributed system that satisfies the advantages set forth above. Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for managing data in a distributed system comprising:
   identifying a first memory device and a second memory device from a plurality of memory devices, wherein the first memory device and the second memory are associated with a data object;
   storing the data object on the first memory device and the second memory device;
   determining that one of the first memory device and the second memory device has become inaccessible;
   identifying, in response to determining that one of the first memory device and the second memory device has become inaccessible, a selected one of the first memory device and the second memory device that remains accessible;
   associating a third memory device with the data object in response to determining that one of the first memory device and the second memory device has become inaccessible; and
   copying the data object from the selected memory device to on the third memory device.

2. The method of claim 1, wherein identifying the first memory device and the second memory device comprises:
   reading a first value and a second value associated with the data object in a hash table, wherein the first value identifies the first memory device and the second value identifies the second memory device.

3. The method of claim 1, further comprising disassociating the first memory device from the data object in response to determining that the first memory device has become inaccessible.

4. The method of claim 1, further comprising:
   determining that a fourth memory device has become accessible.

5. The method of claim 4, further comprising:
   reading a first value and a second value associated with a second data object in a hash table, wherein the first value identifies the second memory device and the second value identifies the third memory device; and
   associating a third value with the second data object in the hash table in response to determining the fourth memory device has become accessible, wherein the third value identifies the fourth memory device.

6. The method of claim 4, further comprising:
   storing the identity of the second memory device; and
   referencing the stored identity of the second memory device to access a stored data object that was stored prior to the fourth memory device becoming accessible.

7. The method of claim 1, wherein the data object comprises transient information.

8. A data management system comprising:
   a plurality of memory devices comprising:
      a first memory device operable to store a data object;
      a second memory device operable to store the data object; and
      a third memory device operable to store the data object in response to a change in status of one of the plurality of memory devices; and
   a processor operable to:
      determine that one of the first memory device and the second memory device has become inaccessible;
      identify, in response to determining that one of the first memory device and the second memory device has become inaccessible, a selected one of the first memory device and the second memory device that remains accessible; and copy the data object from the selected memory device to the third memory device; and a host table operable to associate the data object with the first memory device and with the second memory device and to associate the data object with the third memory device in response to one of the first memory device and the second memory device becoming inaccessible.

9. The system of claim 8, herein each memory device is operable to:

identify, based on the host table, memory devices that are associated with a first data object in response to a first delete request specifying the first data object;

transmit the delete request to the identified memory devices; and delete a second data object in response to a second delete request received from another memory device.

10. The system of claim 8, wherein:

the host table is operable to disassociate the first memory device from the data object in response to the first memory device becoming inaccessible.

11. The system of claim 8, further comprising a fourth memory device and a second data object, wherein the second data object is associated with the second memory device and the third memory device, and wherein at least one of the memory devices is operable to associate the fourth memory device with the second data object in response to the fourth memory device becoming accessible.

12. The system of claim 11, wherein:

the host table is operable to store the identity of the second memory device and at least one of the memory devices is operable to retrieve the identity of the second memory device in order to access a data object stored before the fourth memory device became accessible.

13. The system of claim 8, wherein the plurality of memory devices are operable to:

receive an object key associated with a data object;

hash the object key to create a hash value; and use the value to identify the first memory device and second memory device associated with the data object in the host table.

14. The system of claim 8, wherein the data object comprises transient data.

15. An apparatus for managing data, comprising:

a processor operable to:

determine that one of a first memory device and a second memory device has become inaccessible;

identify, in response to determining that one of the first memory device and the second memory device has become inaccessible, a selected one of the first memory device and the second memory device that remains accessible; and copy a data object from the selected memory device to a third memory device; and a host table operable to associate the data object with the first memory device and with the second memory device and operable to associate the data object with the third memory device in response to one of the first memory device and the second memory device becoming inaccessible.

16. The apparatus of claim 15, wherein:

identifying the selected memory device comprises reading at least one of a first value and a second value from a host pair associated with the data object in the host table, wherein the first value identifies the first memory device and the second value identifies the second memory device; and associating the third memory device comprises adding a third value identifying the third memory device to the host pair associated with the data object in the host table.

17. The apparatus of claim 15, wherein a second data object is associated with the second memory device and the third memory device in the host table, and wherein the host table is operable to associate a fourth memory device with the second data object in response to the fourth memory device becoming accessible.

18. The apparatus of claim 15, wherein the host table is further operable to disassociate the data object from the first memory device in response to the one of the first memory device and the second memory device becoming inaccessible.

19. The apparatus of claim 15, wherein the host table is further operable to:

determine that a fourth memory device has become accessible;

store the identity of a selected one of the second memory device and the third memory device; and reference the stored identity of the selected memory device to access a stored data object that was stored prior to the fourth memory device becoming accessible.

20. A computer readable medium having code for managing data, the code operable to:

identify a first memory device and a second memory device from a plurality of memory devices, wherein the first memory device and the second memory are associated with a data object;

store the data object on the first memory device and the second memory device;

determine that one of the first memory device and the second memory device has become inaccessible;

identify, in response to one of the first memory device and the second memory device becoming inaccessible, a selected one of the first memory device and the second memory device that remains accessible;

associate a third memory device with the data object in response to determining that one of the first memory device and the second memory device has become inaccessible; and copy the data object from the selected memory device to en the third memory device.

21. The computer readable medium of claim 20, wherein the code is operable to identify the first memory device and the second memory device by reading a first hash value and a second hash value associated with the data object in a host table, wherein the first hash value identifies a first memory device and the second hash value identifies a second memory device; and wherein the code is further operable to associate a third hash value with the data object in the host table in response to determining that one of the first memory device and the second memory device has become inaccessible.

22. The computer readable medium of claim 20, wherein the code is further operable to disassociate the inaccessible memory device from the data object in response to determining that the inaccessible memory device has become inaccessible.

23. The computer readable medium of claim 20, wherein the code is further operable to:

determine that a fourth memory device has become accessible.

24. The computer readable medium of claim 23, wherein the code is further operable to:
- store the identity of a selected one of the second memory device and the third memory device; and
- reference the stored identity of the selected memory device to access a stored data object that was stored prior to the fourth memory device becoming accessible.

25. The computer readable medium of claim 23, wherein the code is further operable to:
- read a first value and a second value associated with a second data object in a hash table, wherein the first value identifies the second memory device and the second value identifies the third memory device; and
- associate a third value with the second data object in the hash table in response to determining the fourth memory device has become accessible, wherein the third value identifies the fourth memory device.

26. The computer readable medium of claim 20, wherein the data object comprises transient information.

27. A system for managing data in a distributed system, comprising:
- means for identifying a first memory device and a second memory device from a plurality of memory devices, wherein the first memory device and the second memory are associated with a data object;
- means for storing the data object on the first memory device and the second memory device;
- means for determining that one of the first memory device and the second memory device has become inaccessible;
- means for identifying, in response to determining that one of the first memory device and the second memory device has become inaccessible, a selected one of the first memory device and the second memory device that remains accessible;
- means for associating a third memory device with the data object in response to determining that one of the first memory device and the second memory device has become inaccessible; and
- means for copying the data object from the selected memory device to the third memory device.

28. The system of claim 27, wherein the means for identifying the first memory device and the second memory device comprises:
- means for reading a first hash value and a second hash value associated with the data object in a host table, wherein the first hash value identifies the first memory device and the second hash value identifies the second memory device.

29. The system of claim 27, further comprising:
- means for disassociating the inaccessible memory device from the data object in response to determining that the inaccessible memory device has become inaccessible.

30. The system of claim 27, further comprising:
- means for determining a fourth memory device has become accessible.

31. The system of claim 30, further comprising:
- means for reading a first hash value and a second hash value associated with a second data object in a host table, wherein the first hash value identifies the second memory device and the second hash value identifies the third memory device; and
- means for associating a third hash value with the second data object in the host table in response to determining that the fourth memory device has become accessible, wherein the third hash value identifies the fourth memory device.

32. The system of claim 27, further comprising:
- means for storing the identity of a selected one of the second memory device and the third memory device; and
- means for referencing the stored identity of the selected memory device to access a stored data object that was stored prior to the fourth memory device becoming accessible.

33. The system of claim 27, wherein the data object comprises transient information.

* * * * *